US010395456B2

(12) United States Patent
Amir et al.

(10) Patent No.: US 10,395,456 B2
(45) Date of Patent: Aug. 27, 2019

(54) NOISE-TOLERANT SECURITY SYSTEM

(71) Applicant: CenTrak, Inc., Newtown, PA (US)

(72) Inventors: Israel Amir, Princeton, NJ (US); Tim Boger, Ambler, PA (US)

(73) Assignee: CenTrak, Inc., Newtown, PA (US)

( * ) Notice: Subject to any disclaimer, the term of this patent is extended or adjusted under 35 U.S.C. 154(b) by 0 days.

(21) Appl. No.: 15/849,338

(22) Filed: Dec. 20, 2017

(65) Prior Publication Data

US 2018/0182192 A1 Jun. 28, 2018

Related U.S. Application Data

(60) Provisional application No. 62/498,469, filed on Dec. 23, 2016.

(51) Int. Cl.

| | |
|---|---|
| ***G07C 9/00*** | (2006.01) |
| ***G08B 21/02*** | (2006.01) |
| ***H04W 4/80*** | (2018.01) |

(52) U.S. Cl.

CPC ...... *G07C 9/00111* (2013.01); *G07C 9/00309* (2013.01); *G08B 21/0261* (2013.01); *G08B 21/0275* (2013.01); *H04W 4/80* (2018.02); *G07C 9/00904* (2013.01)

(58) Field of Classification Search

CPC ............ G07C 9/00111; G07C 9/00309; G07C 9/00904; H04W 4/80; G08B 21/0261; G08B 21/0275

USPC .................................................. 340/5.6–5.65

See application file for complete search history.

(56) References Cited

U.S. PATENT DOCUMENTS

| | | | | |
|---|---|---|---|---|
| 9,881,472 B2 * | 1/2018 | Wong | G08B 13/2434 | |
| 2011/0199920 A1 * | 8/2011 | Takei | G01S 13/767 | 370/252 |
| 2013/0038498 A1 * | 2/2013 | Ferrer-Herrera | H01Q 1/007 | 343/788 |

* cited by examiner

*Primary Examiner* — Allen T Cao

(74) *Attorney, Agent, or Firm* — Kaplan Breyer Schwarz, LLP

(57) ABSTRACT

A security system and method includes a tag that continues to function in the presence of LF noise by (i) detecting the LF noise, and (ii) generating an RF signal comprising information that causes a controller to issue a lock command.

28 Claims, 9 Drawing Sheets

NOISE-TOLERANT SECURITY SYSTEM

STATEMENT OF RELATED CASES

This case claims priority of U.S. Pat. Application Ser. No. 62/498,469 filed Dec. 23, 2016, which is incorporated herein by reference.

FIELD OF THE INVENTION

The present disclosure relates to security systems.

BACKGROUND

Healthcare facilities (e.g., nursing homes, hospitals, etc.) typically have a security system to address issues such as patient/resident wandering and infant protection. These systems often operate at low radio frequencies (LF), such as 125 KHz.

FIG. 1 depicts a typical LF security system in hallway 100 of a health care facility. The system includes controller 108, tag 110, and remotely controlled lock mechanism (hereinafter "lock") 106, the latter element for locking or unlocking doors 104 of doorway 102. As discussed further below, the controller and tag communicate with one another, and, based on those communications and under appropriate conditions, the controller causes the doors to lock.

The salient elements of controller 108, which are depicted in FIG. 2, include processor 212, LF exciter 214, RF receiver 218 (or RF transceiver), and antennas 216 and 220. Elements of tag 110, as relevant here, are depicted in FIG. 3, and include power supply 322, processor 324, data storage 326, LF receiver 328, RF transmitter 330, and antenna 332. Tag 110 is typically worn (e.g., wrist band, ankle band, etc.) by a person, for example, a resident/patient, to control wandering and prevent elopement, or an infant for safety monitoring. See, e.g., "Patient Tag," "Umbilical Tag," "Newbaby™ Tag," commercially available from CenTrak Inc. of Newton, Pa. Tag 110 is typical of a real-time location system (RTLS) tag or security tag, although typically, an RTLS tag includes an RF transceiver (or both an RF transmitter and RF transceiver) while a security tag typically only includes a RF transmitter.

Controller 108 operates as follows. LF exciter 214 transmits, via antenna 216, a low frequency (e.g., 125 KHz) signal. The signal is transmitted at a relatively high-rate of repetition (as frequently as every 100 milliseconds or so, and typically no more than every 500 milliseconds). The packet conveyed by the LF signal includes, among any other information, an identifier (e.g., identification code, etc.) of LF exciter 214. Controller 108 is also capable of receiving an RF signal at its RF receiver 218 via antenna 220. The RF receiver is capable, in conjunction with processor 212, of decoding/extracting information from the received RF signal, and, based thereon, generating and transmitting a control signal (i.e., a "lock command") to lock 106.

Tag 110 is capable of receiving an LF signal at LF receiver 328 and, in conjunction with processor 324, decoding/extracting information from the signal, such as the I.D. of the LF exciter 214. The tag is further capable, via RF transmitter 330, processor 324, and antenna 332, of generating an RF signal and encoding information therein, such as the I.D. of the LF exciter 212 and the tag's own identifier, the latter retrieved from data storage 326.

Referring now to FIG. 4, which is a protocol flow chart illustrating the operation of the prior-art security system, and with continued reference to FIGS. 1-3, when resident/ patient/infant (hereinafter collectively "resident") R1, wearing tag 110, is in range 109 of LF exciter 214 in controller 108, the tag's LF receiver 328 receives the LF signal transmitted by LF exciter 214. Under the control of processor 324, the LF exciter's I.D. is decoded/extracted from the LF signal. RF transmitter 330 of tag 110 generates an RF signal that encodes the extracted LF exciter I.D. as well as the tag's 110 own I.D. The tag then transmits the RF signal.

RF transceiver 218 in controller 108 receives the RF signal from tag 110 via antenna 220. RF receiver 218 typically operates at a frequency in one of the industrial, scientific, and medical radio bands ("ISM bands"), such as 433 MHz, 902-928 MHz, 2.4 GHz, 5 GHz. The protocol can be a standard protocol, such as Zigbee, Bluetooth, BLE, and WiFi among others, or a proprietary protocol.

RF receiver 218 decodes the received RF signal. If the signal contains the I.D. of LF exciter 212 (indicating, among anything else, that the signal is intended for this particular controller) and optionally the tag I.D., controller 108 sends a lock command to lock 106, thereby locking doors 104, preventing egress of resident R1.

Remotely controlled door locks are widely available and their design and operation is well understood by those skilled in the art and so will only be briefly discussed herein. Such door locks can be controlled via a wired or wireless link. In the illustrative embodiment, controller 108 is hardwired the lock mechanism. To change the state of the lock (i.e., to "lock" it or "unlock" it), controller 108 sends a control signal, which is voltage of some value, to the lock mechanism. In response to the voltage, and via the operation of various relays, switches, actuators, etc., the lock engages or disengages.

The high rate of packet transmission, as noted above, is necessary to make sure that a fast-moving tag (i.e., on a fast-moving person) will receive the LF signal, decode it, and transmit to controller 108 so that a lock command is sent from the controller to lock 106 before the resident arrives at the door.

Security systems employing 125 KHz technology are susceptible to disruption via LF fields emanating from various sources, such as PROX (proximity) card systems. These systems include cards and readers that communicate via 125 KHz RF fields. PROX card systems are often present in healthcare facilities to enable staff to unlock the (same) doors protected by the aforementioned security system. The LF electromagnetic field emanating from the PROX card reader can interfere with the operation of the LF receiver in the tag.

In particular, in the presence of such LF emissions (noise), the tag's LF receiver is not able to recognize the LF signal from the LF exciter or, at least, is not able to recognize the LF exciter's I.D. Although the tag may continue to periodically transmit RF signals in accordance with its normal operation, the signals will not include the LF exciter I.D., since it is not recoverable due to the LF noise. A controller receiving such an RF signal will not transmit a lock command since the LF exciter I.D. is not present (the presence of the LF exciter I.D. in the RF signal triggers the controller to transmit a lock command).

Other equipment, such as cellphone/tablet display screens, and electronic instruments, if placed very close to a tag, can similarly affect a tag based on the LF emissions they generate. This problem is illustrated in FIGS. 5A and 5B, and discussed more fully in the accompanying text.

FIGS. 5A and 5B depict the same environment as FIG. 1, with the same prior-art security system, except that, in FIG. 5A, PROX card reader 540 is now present in hallway 100 to enable a staff member having a PROX card to pass through doorway 102. And in FIG. 5B, resident R1 uses cell phone 544 to circumvent the security system. In particularly, the LF noise emanating from the display of cell phone 544 prevents tag 110 from recovering the LF exciter I.D. As a consequence, the RF signal transmitted by the tag will not include the LF exciter I.D. and, hence, will not trigger a lock command.

Referring to FIG. 5A, resident R1, wearing tag 110, is initially at location L1 beyond the range 109 of signal S1 transmitted from the controller's LF exciter 212. Resident R1 then moves to location L2 within range 109 of the signal, and, consequently, tag 110 receives LF signal S1 from LF exciter 212. The tag then generates and transmits RF signal S2 carrying the I.D. of the LF exciter and its own I.D., as previously discussed. RF signal S2 is received by controller 108. Since the LF exciter I.D. and the tag's I.D are present in RF signal S2, controller 108 sends a "lock command" to lock 106.

Resident R1 continues moving forward towards doorway 102, reaching location L3. This location is within range 542 of LF emissions S3—effectively "noise"—from PROX reader 540. LF emissions S3 interfere with the operation of tag 110, such that any RF signal transmitted by the tag will not contain the LF exciter I.D. (or anything else that would trigger a lock command). Controller 108 receives the RF signal, but the absence of the LF exciter I.D. is interpreted, effectively, to mean that tag 110 has left the immediate area. Consequently, after a predetermined period-of-time elapses since a "lock command" was last received, which is usually about 15 seconds, controller 108 sends an "unlock command" to lock 106. This is depicted in the protocol flow chart of FIG. 4.

It is notable that once tag 110 is in an LF-noise-free environment, it will be able to decode the LF signal from the controller and transmit RF that includes the LF exciter I.D., such that the controller would then issue a lock command. However, in the scenario depicted in FIG. 5A, and as is often the case, PROX card reader 540 is very close to doorway 102, such that the doorway is within range 542 of the LF emissions from PROX card reader 540. As such, resident R1 can reach doorway 102 while tag 110 remains effectively inoperable, pass through the unlocked doors 104, and "escape."

Turning now to FIG. 5B, resident R1 places cellphone 544 on tag 110 with the intent of circumventing the security system. Initially, the resident is at location L4, which is out of range 109 of the LF exciter in controller 108. Resident R1 eventually moves within range 109, such as to location L5. As a consequence of LF emissions S4 from the display of cell phone 544, the resident's tag 110 cannot process LF signal S1 from the LF exciter. Any RF signals that tag 110 then transmits will not result in controller 108 issuing a lock command (i.e., because the RF signal does not include the LF exciter I.D.).

Assuming that cellphone 544 abuts tag 110 before the resident moves into range 109 of the LF exciter, doors 104 will be unlocked. Assuming cellphone 544 and tag 110 remain very close to one after the resident moves into range 109 of the LF exciter, resident R1 can proceed through doorway 102 without delay (since any RF signal transmitted to the controller would not include the LF exciter I.D.). If cellphone 544 was placed on tag 110 sometime after the resident moves into range 109 of the controller's LF exciter, a lock command would have been issued and the resident might have to wait 15 seconds for the door to unlock. But in either case, someone wishing to defeat the security system is able to do so by exposing tag 110 to LF interference. This same scenario (i.e., placing a cell phone on a tag) can be used by a person wishing to remove a tagged newborn, etc., from such a facility.

FIG. 6 depicts method 600, which shows operations performed by controller 108 of the security system discussed above in conjunction with FIGS. 1-5.

In operation 602, the controller (via its LF exciter) generates and transmits an LF signal. The controller generates the LF signal on a regular basis, such as once every 100 to 500 milliseconds. After generating an LF signal, the controller performs at least some of the operations 603 through 608.

In operation 603, query whether an RF signal is received by the controller (i.e., such as from a tag). If "yes," then query at operation 604 whether the received RF signal contains the I.D. of the LF exciter and the I.D. of the tag. If "yes," then at operation 605, cause one or more doors controlled by the controller to lock, such as by sending a "lock command" to the appropriate door(s). Also, a "lock" timer is started.

If the response to the query at operation 604 is "no," this is interpreted to mean that the RF signal is not from a nearby tag. Query, at operation 606, if the door is locked. If not, processing stops at 609 until the next LF signal is generated at operation 602.

If the response to the query at operation 606 is "yes," this means that a tag has been in range of the controller recently. Then query, at operation 607, whether the amount of time that the lock timer has been running is greater than or equal to a predetermined value (i.e., "Y" seconds), representing the delay prior to transmitting an unlock command. As previously indicated, a typical value for Y—the delay—is about 15 seconds.

If the query at operation 607 returns a "yes," then at operation 608, the door is unlocked (i.e., an unlock command is transmitted). Processing then stops at 609 until the next LF signal is generated at operation 602.

If the query at operation 607 returns a "no," this means that the door should remain locked because an insufficient amount of time has elapsed since the last lock command was received. Processing stops at 609 until the next LF signal is generated at operation 602.

If, at operation 603, the query returns a "no," this is interpreted to mean that a tag is not in the area. Processing then continues through operations 606 through 608, as appropriate, per the above discussion.

FIG. 7 depicts method 700, which shows operations performed by tag 110 of the security system discussed above in conjunction with FIGS. 1-5.

At operation 702, the tag receives electromagnetic (EM) energy. Query, at operation 703, whether the transmission has a frequency of 125 kHz (or other frequency to which the tag is designed to respond).

If the query at operation 703 returns a "yes," the I.D. of the LF exciter that generated the LF signal is extracted at operation 704. The tag then generates an RF signal that includes the LF exciter I.D. and the tag's own I.D. at operation 705, and transmits that RF signal at operation 706.

If the query at operation 703 returns a "no," processing continues at operation 706. The tag continues to send an RF signal, but that signal does not include the LF exciter I.D. As previously discussed, if the EM transmission that the tag receives includes the 125 kHz (LF) signal as well as other LF emissions, the tag will not recognize the LF signal and not decode the Exciter I.D.

As FIGS. 5A, 5B, and 7 illustrate, receiving a "no" in response to the query at operation 604 does not necessarily mean a tag is not in the area. It could be the result of LF noise interfering with the tag's ability to recognize/decode the LF signal from the LF exciter. And in such a situation, prior-art method 600 could result in a door being unlocked when it should remain locked. Consequently, there is a need for a security system, and a method for its operation, that is better able to address the presence of LF noise.

SUMMARY

Embodiments of the invention address the problem of LF emissions from sources other than the LF exciter—effectively LF noise—interfering with the operation of the tag.

In some embodiments, the inventive security system comprises a tag that, when exposed to LF noise, detects the noise. Once the presence of noise is detected, the inventive tag will transmit an RF signal that includes the last LF exciter I.D. that it received. As previously discussed, in the presence of LF noise, a prior-art tag will transmit RF, but it will not include a LF exciter I.D.

The implications of this distinction are clear from FIG. 6 (controller operation). In the prior art, in the presence of LF noise, the answer to the query at operation 604 will be "no." In that case, a "lock command" will not be sent to the door. This would enable a resident to leave a health care facility without supervision/permission (either after a short delay or no delay, depending on the status of the lock timer). In contrast, since the inventive tag will transmit an RF signal that includes an LF exciter I.D. (i.e., the last one it received) in the presence of LF noise, the answer to operation 604 is "yes," and a lock command will be sent. This prevents possible resident elopement, etc., resulting from the LF noise.

In some embodiments, the tag is capable of simply "detecting" the LF noise in the received EM signal. In some other embodiments, the tag is further capable of characterizing the LF noise. In other words, in such other embodiments, the tag is able to analyze the noise to extract a noise signature and/or specific characteristics of the noise. Such characteristics are compared to reference noise signatures to determine a likely source for the LF noise.

In some embodiments, when the tag is clear of the LF interference and out of range of the LF exciter, it sends a command to the controller that causes the controller to issue an "unlock command." In the prior art, as previously discussed, the door remains locked for about 15 seconds after receiving the last "lock command." To the extent that authorized individuals are waiting to access the locked door, such a wait can be annoying at best and life threatening at worst. The inventive tag, by explicitly transmitting an "unlock command," enables the door to unlock more quickly than the prior art. Furthermore, in some embodiments, once the tag receives an acknowledgement from the controller to the "unlock command," the tag stop transmitting the "unlock command."

In some embodiments, the decision of whether to issue a lock command when the tag is exposed to LF noise, and the nature of the transmission (i.e., unicast or broadcast), is based one or both of: (i) whether an LF signal was received immediately prior to exposure to the LF noise, and (ii) the source and/or characteristics of the LF noise.

Consider a first scenario in which a PROX card reader is near to a door that is controlled by the inventive security system. The signal range of the LF exciter is greater than, and encompasses, the range of the LF emitted by the PROX reader. With this arrangement, the tag will necessarily receive an LF signal from the LF exciter immediately prior to being exposed to LF noise. Thus, if a tag is exposed to LF noise immediately after receiving an LF signal from which it extracts an LF exciter I.D., it is quite likely that the tag is near and moving toward a door controlled by the security system. Consequently, there is a high level of confidence that it is appropriate for the tag to generate and transmit to the controller an RF signal that causes the controller to issue a "lock command." In this specification and the appended claims, the phrase "immediately before" or "immediately after," when referencing a time when a signal was last received or a command was last transmitted, it means a time that is about equal to the rate at which the signal (the tag received) was transmitted or the rate at which the signal the tag transmits was last sent. For example, consider the context of a tag being exposed to LF noise "immediately after receiving an LF signal." If the LF exciter transmits an LF signal every 100 milliseconds, then receiving an LF exciter I.D. "immediately before" detecting LF noise means detecting the LF noise about 100 milliseconds after receiving the last LF exciter I.D.

Consider a second scenario wherein there is a PROX card reader in a hallway, relatively remote from a door protected by the security system of the invention. It is assumed that the tag is not in range of an LF signal (i.e., from the LF exciter in a controller). If the tag, after being exposed to LF noise from the PROX card reader, were to send an RF signal that triggered a lock command (e.g., such as by including the last-received LF exciter I.D. in the RF signal), the door associated with the controller (having the LF exciter indicated by the I.D.) will lock. There is, however, probably no need for that door to lock, since the tag is not likely to be in the vicinity of that door.

Consider a third scenario in which someone is trying to defeat the security system by placing a cellphone screen directly on the tag, such that tag is exposed to LF noise therefrom. This might occur before the tag is exposed to an LF signal. In contrast to the first scenario, in this scenario, it would be appropriate for the controlled doors that are closest to the tag to lock.

In consideration of scenarios two and three, if the tag is not capable of distinguishing LF noise from a PROX card read and LF noise from a cell phone display screen, in some embodiments, the tag will transmit an LF signal that results in a lock command. More particularly, since it cannot be assumed that the tag is near any particular door, in some embodiments in which a tag receives LF noise without having been in the range of the LF exciter immediately prior, the tag broadcasts a command via an RF signal that causes all controllers receiving the signal to transmit a "lock command" to the locks they control.

To limit the number of doors that will lock and the possibility of any doors inappropriately locking when there is no threat of elopement in some embodiments, the RF signal, as received by a controller, must meet/exceed a threshold RSSI for the controller to issue a lock command. Thus, doors that are far from the tag will not lock. In some other embodiments, the tag has, in memory, a list containing the I.D. of each controller and transmits, via sequential RF signals, a unicast command to some or all of the controllers, which causes each identified controller to transmit a "lock command" to the lock(s) they control. If the tag is equipped to determine its position, and if a location is available for each controller, the tag can determine which of the controllers should receive the unicast command based on proximity.

In some embodiments, the tag is capable of analyzing noise characteristics to determine a likely source of the noise. In some such embodiments, the tag takes the source of the LF noise into account to decide whether to transmit an RF signal that results in the controller issuing a "lock command."

For example, consider a situation in which a tag receives LF noise without having been, immediately prior, in range of the LF exciter, and analysis of the LF noise suggests that its source is a PROX card reader. As previously discussed, in such a situation, it might not be desirable to trigger a lock command. As a consequence, in such a situation, the RF signal generated by the tag might not trigger controller(s) to issue a "lock" command.

On the other hand, consider a situation in which the noise characteristics suggest that the source thereof is the display of a cellphone or tablet. As previously mentioned, it might well be desirable to cause nearby doors to lock in such a scenario. Consequently, in such a situation, the tag will transmit an RF signal, either via broadcast or serial unicast commands, that results in controllers issuing lock commands to respective door locks.

DETAILED DESCRIPTION

Figure 2:
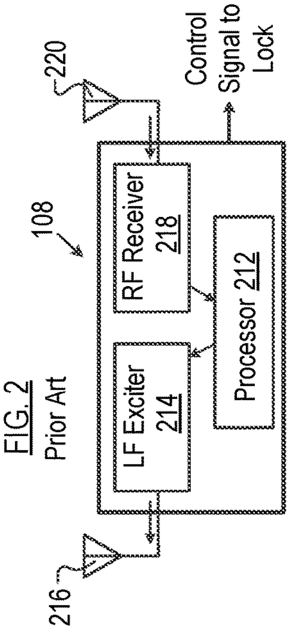
FIG. 2 depicts a block diagram of a controller used in the conventional security system of FIG. 1.

The following definitions are to be used in this disclosure and the appended claims:

- "transmitter" is a device, circuit, or apparatus capable of transmitting an electrical, electromagnetic, infrared, ultrasonic, or optical signal.
- "receiver" is a device, circuit, or apparatus capable of receiving an electrical, electromagnetic, infrared, ultrasonic, or optical signal.
- "transceiver" is a device, circuit, or apparatus capable of transmitting and/or receiving an electrical, electromagnetic, infrared, ultrasonic, or optical signal.
- "LF signal" is an electromagnetic wave in the low-frequency range of the electromagnetic spectrum, typically in the range of 30 kHz to 300 kHz, frequently at 125 kHz, and which conveys information.
- "LF emission" is electromagnetic radiation in the low-frequency range of radio wavelengths, typically in the range of 30 kHz to 300 kHz, frequently at 125 kHz, and which does not convey the same information conveyed in the LF signal. In other words, as used herein and in the appended claims, the term "LF emission" is synonymous with "LF noise" or "LF interference."
- "RSSI" is relative received signal strength in a wireless environment. It is an indication of the power level being received by the receiver. The higher the RSSI, the stronger the signal.
- "Lock command" refers to information conveyed by a signal that is generated by a tag, wherein the information causes the controller to generate a "lock command" and transmit it to a remotely lockable door or other device. The information is not necessarily a set of characters having no interpretation other than "lock the door." For example, in some embodiments, the information is the identification number of the LF exciter, which, when received in an RF signal from the tag, is interpreted by the controller to be a "lock command." Thus, a "lock command" is any information that the controller interprets as a direction to generate and transmit a "lock command" or otherwise cause a door to lock. For exemplary purposes herein, if the tag's RF transmission contains the LF exciter ID, then that RF transmission will cause the controller cause the door to lock. However, other data or control signals in the tag's RF transmission may cause the controller to cause the door to lock.
- "Changes a state" or "change-of-state command," encompasses both a "lock command" and an "unlock command." The "change-of-state command" is to be viewed as the "genus," wherein the "lock command" and "unlock command" are several, but not all, species of the genus. In particular, in some alternative embodiments, the final control element of the inventive security system is something other than a lock for locking a door. For example, the "change-of-state command" might result in turning something "on" or "off," etc. Thus, the "change-of state command" is a command that results in a change of state of the final control element, what it may be.

In the illustrative embodiments, the inventive security system is used in a health-care facility to control egress through a doorway. In some other embodiments, the inventive security system is used in other environments in which ingress/egress must be controlled, such as airport terminals, secure wings of buildings, laboratories, and the like. In yet additional embodiments, the inventive security system is used in other environments to control other types of behavior in other ways, including using different final control elements (i.e., other than a lock), which may be electrical, mechanical, electro-mechanical, optical, opto-mechanical, etc., to change the state of various types of devices/mechanisms, etc., (e.g., lights, alarms, gates, displays, etc.).

Figure 3:
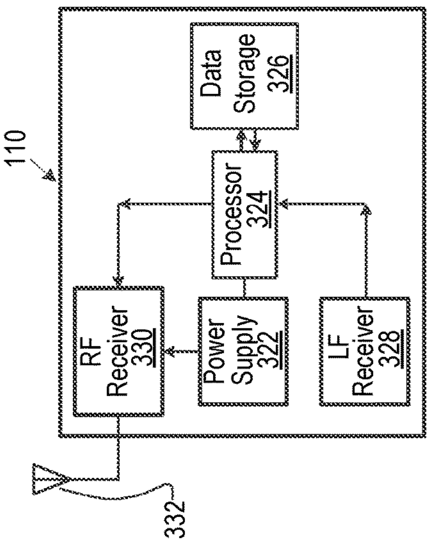
FIG. 3 depicts a block diagram of a tag used in the conventional security system of FIG. 1.
Figure 1:
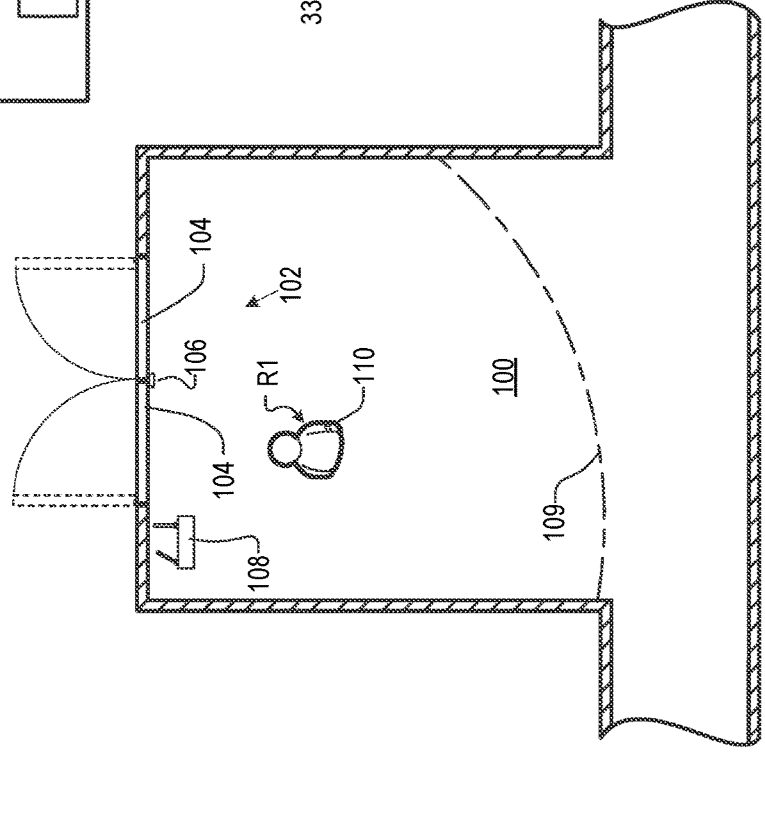
FIG. 1 depicts a conventional security system in a health care environment.
Figure 4:
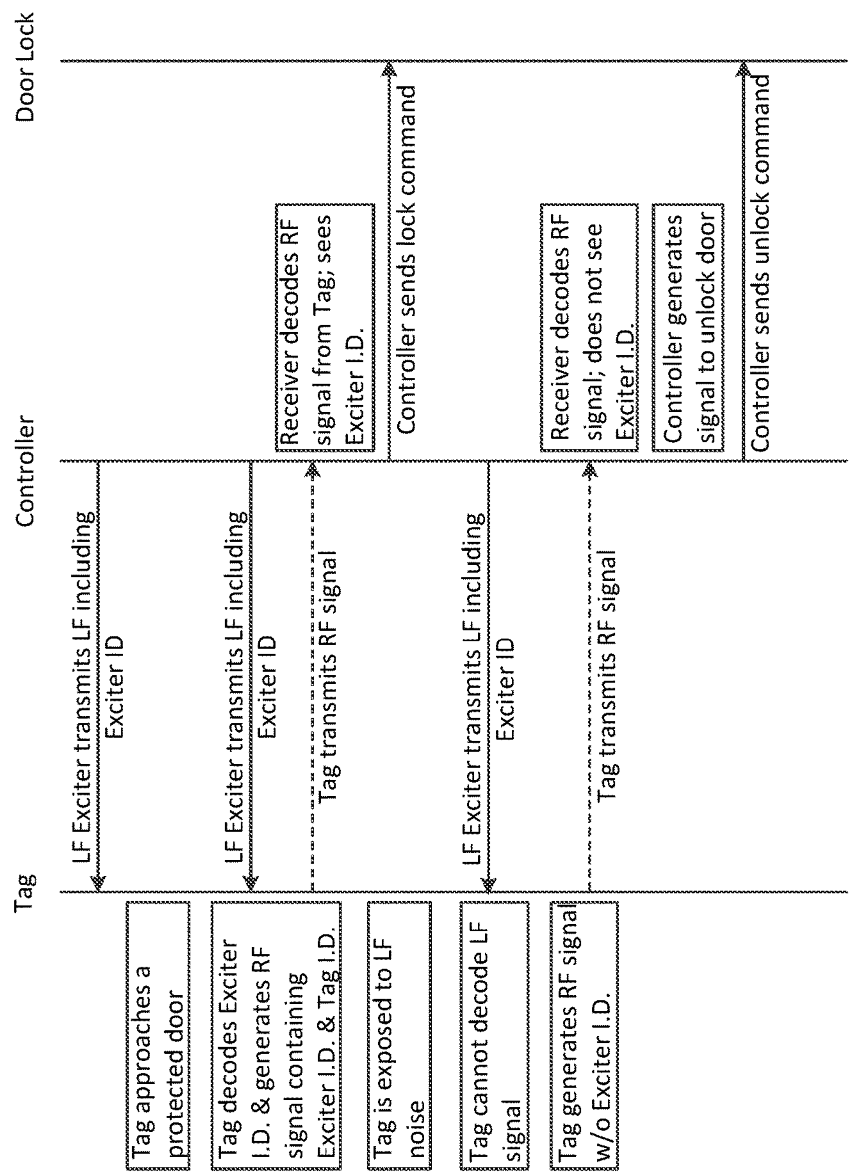
FIG. 4 depicts a protocol flow chart for the operation of the conventional security system of FIG. 1.
Figure 8:
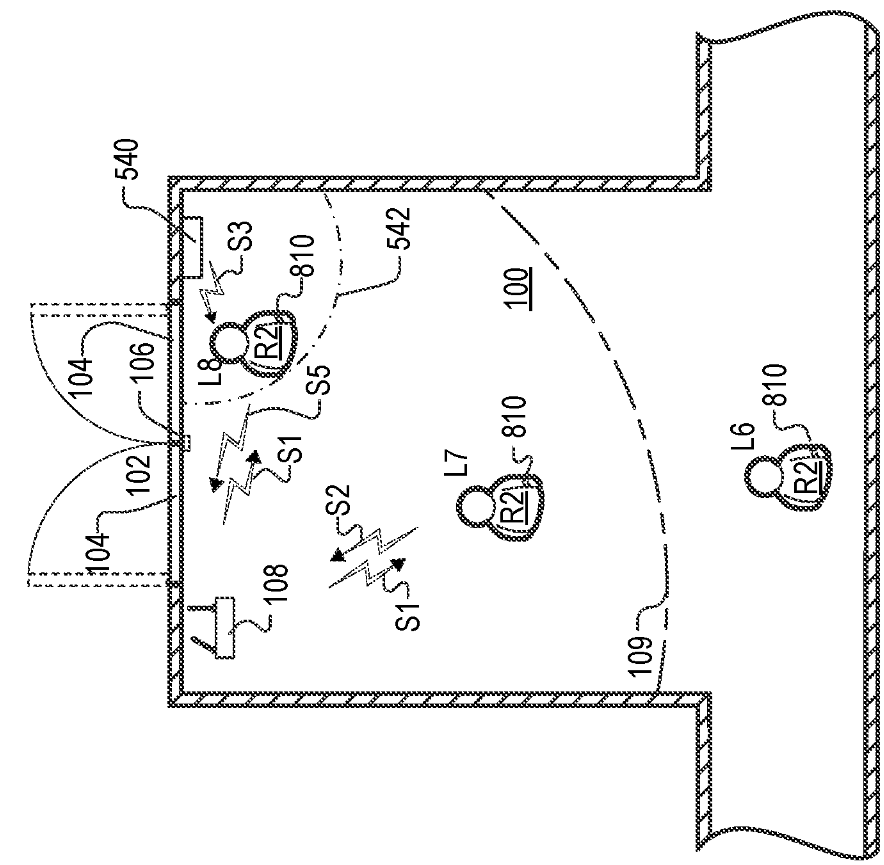
FIG. 8 depicts an illustrative embodiment of a security system and its operation in a health care environment in accordance with the present invention.

FIG. 8 depicts an illustrative embodiment of a security system in accordance with the present teachings, and the operation thereof. The security system depicted in FIG. 8 includes the same types of elements as the prior-art security system depicted and discussed in conjunction with FIGS. 1-7; namely, controller 108, tag 810, and lock 106. The controller and tag include the same basic functional elements as depicted in FIGS. 2 and 3 (although in some embodiments of the invention, tag 810 includes an RF transceiver, rather than simply an RF transmitter) and controller 108 includes an RF transceiver, rather than simply an RF receiver. Beyond that, the distinctions between the prior-art security system and the inventive security systems disclosed herein relate primarily to the differences in tag 810 versus tag 110 as to signal processing, logic, and the information residing in the tag's data storage.

In FIG. 8, resident R2, wearing tag 810, is initially at location L6 beyond the range 109 of signal S1 transmitted from the LF exciter of controller 108. Resident R2 then moves to location L7 within range 109 of the signal, and, consequently, tag 810 receives LF signal S1 from the controller's LF exciter. The tag then generates and transmits RF signal S2 which conveys a "lock command" to controller 108.

In the illustrative embodiment, the "lock command" is the presence, in signal S1, of the I.D. of the LF exciter and the tag's I.D. In some alternative embodiments, the "lock command" is the presence, in signal S1, of the I.D. of the LF exciter (i.e., the tag I.D. need not be present). In some other embodiments, the "lock command" is a sequence of characters unrelated to identifiers of the LF exciter and/or the tag. In any case, RF signal S2 is received by controller 108. Since the "lock command," in whatever form, is present in RF signal S2, controller 108 sends a "lock command" to lock 106, thereby locking doors 104.

In some embodiments, tag 810 transmits the RF signal several different rates. For example, when the tag is not in range of the LF exciter, the tag will report at a relatively slow rate, such as at 10-second intervals, which serves as an indicator to the system that the tag is still functioning. When tag 810 is within range 109 of the LF signal from controller 108, the tag will transmit an RF signal (i.e., with lock command) at a relatively high rate of repetition, such as about every 250 milliseconds, until it receives an acknowledgement (i.e., that the RF signal has been received) from controller 108. Once it receives an acknowledgement, tag 810 will report at a slower rate, such as at 3-second intervals. It is notable that tag 810 receives a RF transceiver (or RF transmitter and RF receiver) to alter its operation in response to the controller's "acknowledgment." Although RTLS tags include an RF transceiver (or both a RF transmitter and an RF receiver), security systems typically only include an RF transmitter.

Resident R2 continues moving forward towards doorway 102, reaching location L8. This location is within range 542 of LF emissions S3—effectively "noise"—from PROX reader 540. Unlike prior-art tag 110, tag 810 is able to respond, in one of several ways, in the presence of the LF emissions.

In some embodiments, the received LF EM radiation is analyzed using an algorithm for detecting/decoding the I.D. of the LF emitter. If the algorithm fails to detect the ID, other algorithms are used to characterize the signal.

In some other embodiments, the tag processes the received LF electromagnetic (EM) radiation, such as by filtering, to identify, at a minimum, the presence of LF emissions S3.

In some embodiments, model(s) of the expected/likely noise (i.e., LF emissions S3) is generated from plural test waveforms in advance of system operation. (As previously indicated, noise is likely to arise from PROX card readers and screens of tablets and cellphone, etc.) The noise signature from each likely source is stored, in advance of regular operations, in the tag's data storage. In some embodiments, the tag filters the signal it receives (e.g., using known digital filtering algorithms to characterize and/or classify the signal), or otherwise performs pattern recognition techniques, detects periodicity and/or pulse lengths and correlates the result with the known signatures to: (a) determine if one or both of the LF signal and LF noise are present, and/or (b) correlate the noise to a particular noise source.

In some embodiments, having recognized the presence of any of the potential types of LF emissions S3, tag 810 generates and transmits RF signal S5, which, in the scenario depicted in FIG. 8, includes a "lock command." Controller 108 receives RF signal S5, decodes the "lock command," and, in turn, generates and transmits a "lock command" to lock 106.

Figure 5A:
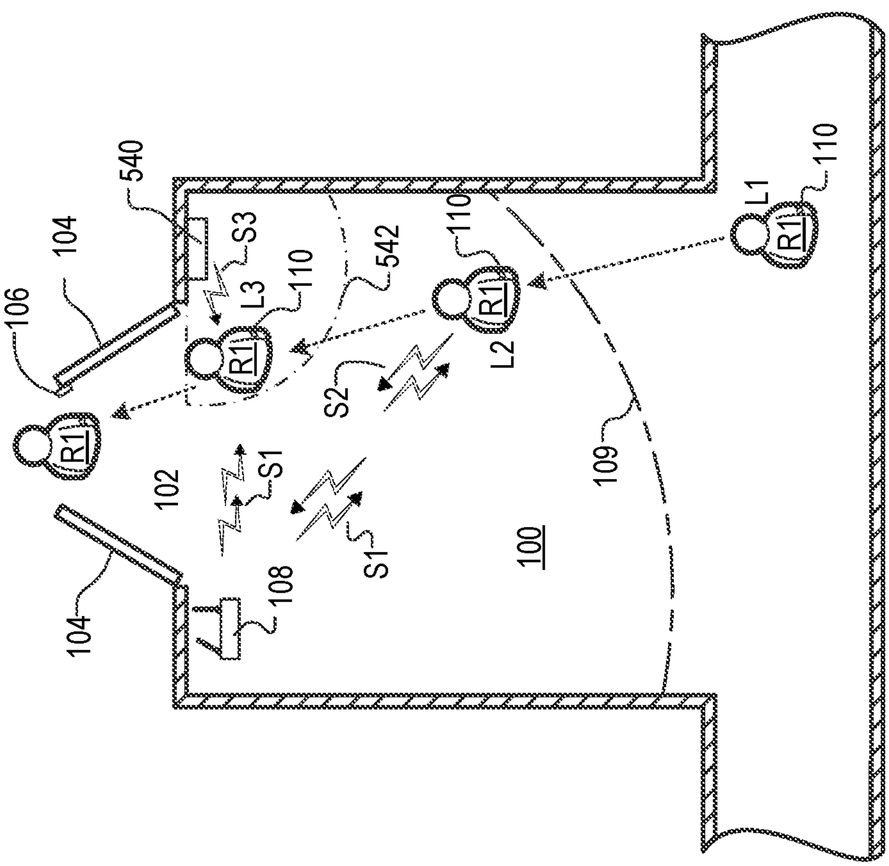
FIG. 5A depicts a first scenario in which LF emissions interfere with the operation of the conventional security system of FIG. 1.
Figure 5B:
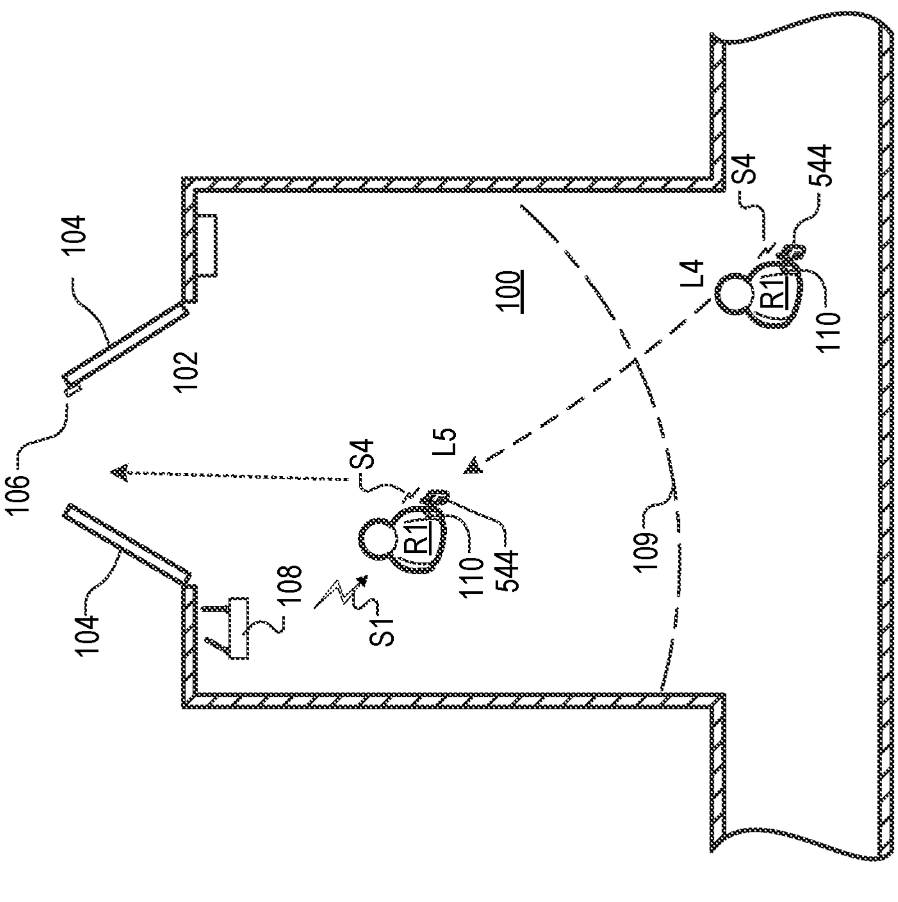
FIG. 5B depicts a second scenario in which LF emissions interfere with the operation of the conventional security system of FIG. 1
Figure 6:
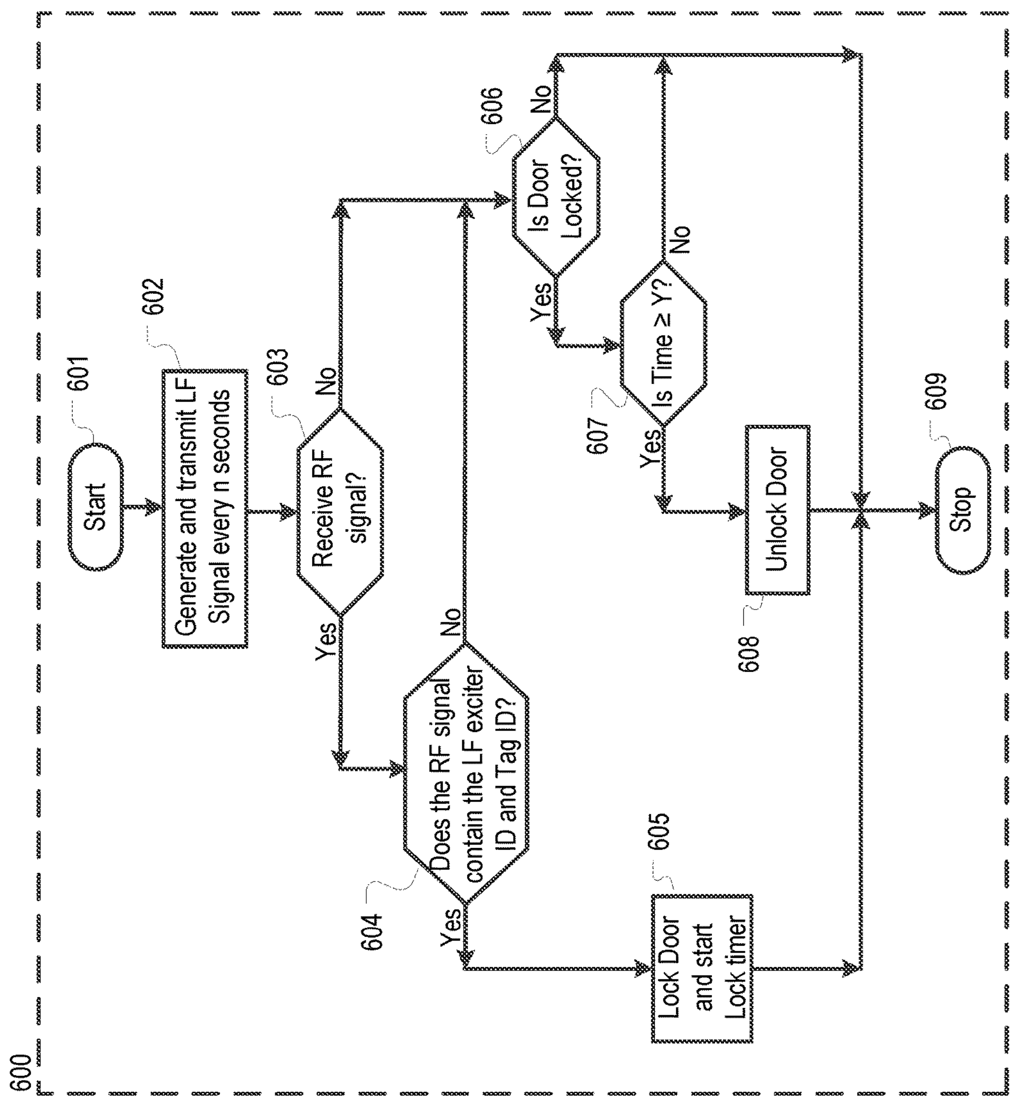
FIG. 6 depicts a method performed by the controller of the conventional security system of FIG. 1.
Figure 7:
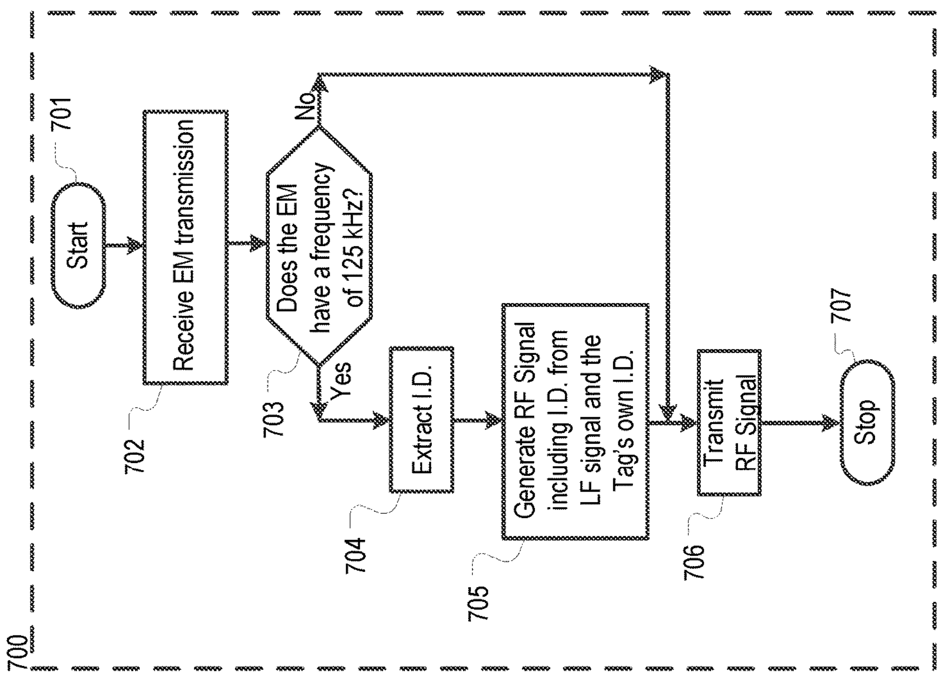
FIG. 7 depicts a method performed by the tag of the conventional security system of FIG. 1.

As such, and unlike the scenario depicted in FIG. 5A, resident R2 cannot exit through doorway 102, even though the doorway is within range 542 of the LF emissions from PROX card reader 540.

In some embodiments, when tag 810 stops detecting a LF signal (moved out of range 109) and is not detecting any LF noise, the tag sends an "unlock command." Once tag 810 receives an acknowledgement from controller 108, it will stop sending the unlock command.

Figure 9:
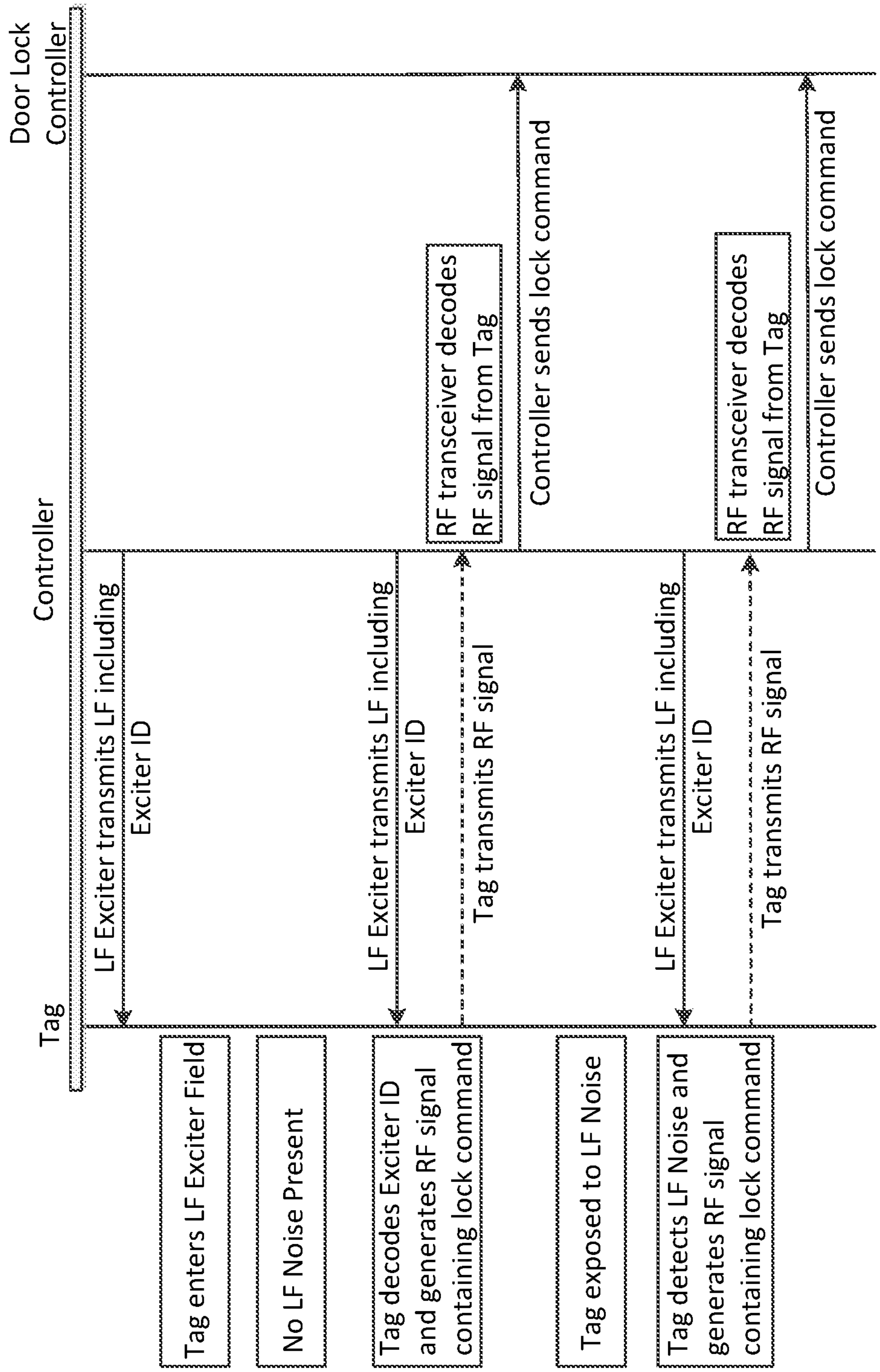
FIG. 9 depicts a protocol flow chart for the security system of FIG. 8.

The operations discussed above are depicted in FIG. 9 via a protocol flow chart.

To the extent that a PROX card reader is relatively close to a door protected by the inventive security system, it is advantageous to ensure that a tag (i.e., a resident wearing a tag) receives an LF signal from the LF exciter before it comes within range of the LF emissions from the PROX card reader. In such embodiments, range 109 of the LF exciter in controller 108 is adjusted, as necessary, to ensure that it encompasses range 542 of LF reader 540, such as depicted in FIG. 8. Such embodiments are discussed further later in this detailed description.

In some embodiments, in addition to determining that LF noise is present, tag 810 determines the likely source of the noise and, based on the specifics of the situation, determines whether to send a "lock command" based on the source of the noise.

Figure 10:
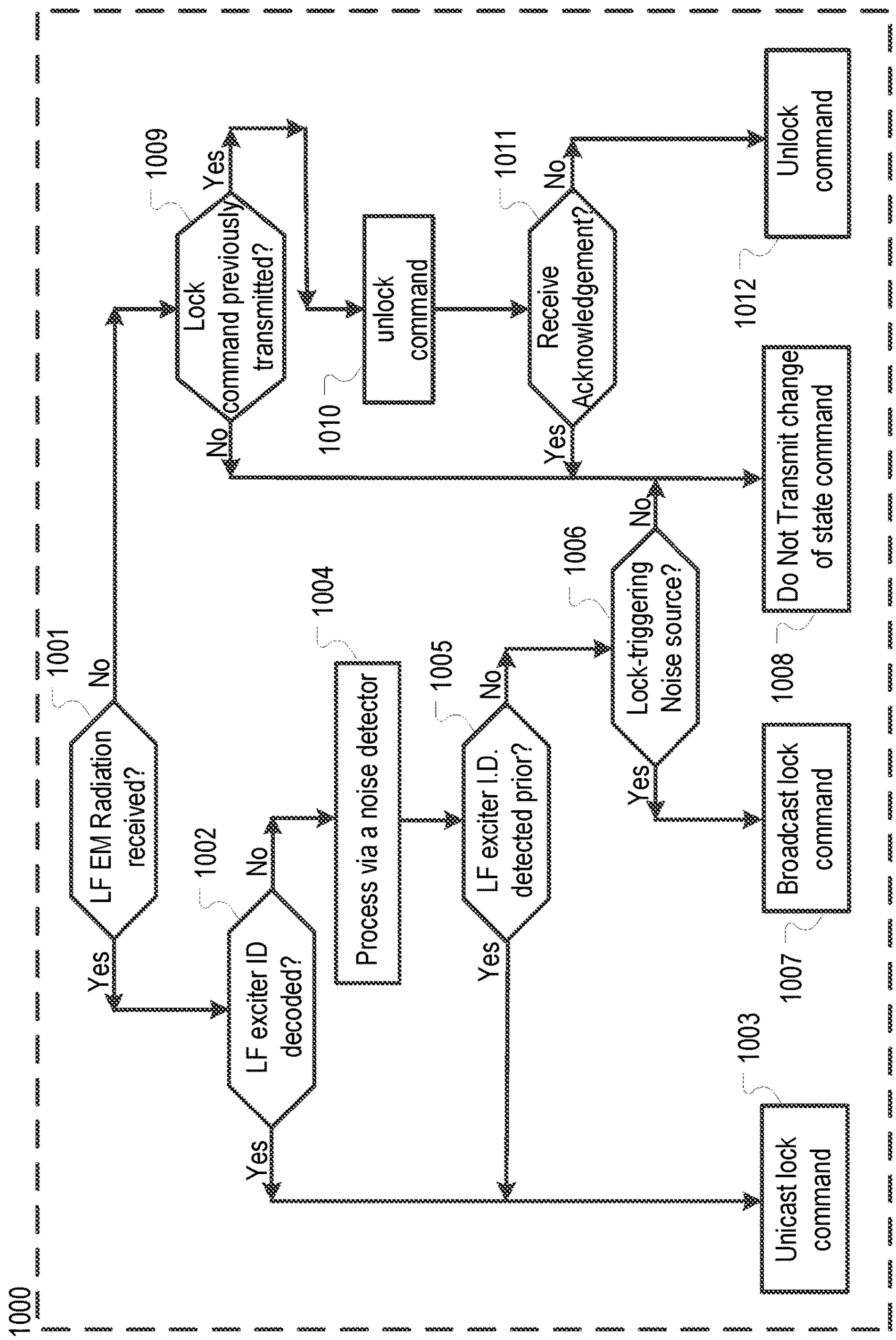
FIG. 10 depicts a method performed by the tag in accordance with the illustrative embodiment of the present invention.

FIG. 10 depicts method 1000, which is the processing performed by tag 810 in accordance with present teachings. Method 1000 is discussed below.

Per operation 1001, is LF EM received? If "yes," then at operation 1002, determine if an LF exciter I.D. is decoded from the LF EM radiation. If "yes," then generate an LF signal incorporating the LF exciter I.D. as the "lock command" at operation 1003. This is, effectively, a unicast that directs a particular controller to lock its associated door(s).

If "no," then process the LF EM radiation in a noise detector, per operation 1004. This operation involves running the LF EM signal though a suitable filtering algorithm to detect the presence of LF emission (i.e., noise) and possibly classify and/or characterize the noise to determine the source and/or type. For example, the PROX reader noise may be identified by the duty cycle and cell phone and tablet interference can be identified using known scan rates for such devices.

At operation 1005, determine if an LF exciter I.D. was detected just prior to noise detection. If "yes," then at operation 1003, generate an LF signal incorporating the last-received LF exciter I.D. as the "lock command."

If, at operation 1005, it is determined that the LF exciter I.D. was not detected just prior to noise detection, then determine, at operation 1006, whether the detected noise should result in a lock command. This operation is discussed further below. If "yes," then broadcast a lock command at operation 1007. The lock command is broadcast because, in the absence of location information, the tag has no knowledge of the location of the LF noise source relative to any particular controller.

As a consequence, to limit the number of doors that will lock due to the broadcast and/or the chance of doors locking improperly, in some embodiments, the RF signal, as received by a controller, must meet/exceed a threshold RSSI for the controller to issue a lock command. Thus, doors that are far from the tag will not lock. In some other embodiments, the tag has, in memory, a list containing the I.D. of each controller and transmits, via sequential RF signals, a unicast command to some or all of the controllers, which causes each identified controller to transmit a "lock command" to the lock(s) they control. If the tag is equipped to determine its position, and if a location is available for each controller, the tag can determine which of the controllers should receive the unicast command based on proximity.

If it is determined, at operation 1006, that the noise should not trigger a lock command, then, per operation 1008, the tag does not issue a lock command (or, more generally, does not issue a change-of-state command).

In operation 1006, a determination is made as to whether the LF noise received by the tag should result in a lock command. As previously discussed, if an LF exciter I.D. is not received immediately prior to detecting the LF noise, it is likely that tag is not near to any door controlled by the security system. This is particularly true if the tag can also classify or characterize the source of the noise. For example, if it is determined to be a PROX card reader, but there is no previously received LF exciter I.D., then the tag is likely near a PROX reader internal to the facility (e.g., a closet, etc.) such that there is likely not an immediate risk of elopement. The tag, in some embodiments, will not broadcast a lock command in such a scenario.

However, if the source of the LF noise is determined to be the screen/display of a cell phone, tablet, etc., there is cause for concern that someone might be attempting to circumvent the security system. As such, in some embodiments, the tag will broadcast a lock command if it is determined that the LF noise source is the screen/display of a cell phone, tablet, or other mobile device.

To detect and possibly determine a likely source of LF noise, characteristics of the LF noise, such as its periodicity, pulse lengths, or spectral features are obtained in known fashion and compared to reference characteristics for known sources of noise, as maintained in data storage accessible to the tag's processor. The source of the LF noise may then be determined by matching the measured characteristics of the (unknown) LF noise to that of a reference. Alternatively, any available and known digital signal processing algorithms for identifying the presence of, and potentially the source of, the LF noise may be used.

If the response to the question "is LF EM radiation received" is "no," then at operation 1009, consider whether a lock command was transmitted immediately prior to not receiving LF EM radiation (i.e., not receiving a LF signal and not receiving LF noise). If the answer to the question at operation 1009 is "no," then the tag does not transmit any "change-of-state command." The tag will typically continue to transmit to indicate it is functioning normally, but it won't transmit a "lock command," an "unlock command," etc.

If the answer to the question at operation 1009 is "yes," then the tag transmits an "unlock command" at operation 1010. In this context, assuming that the tag had previously received an acknowledgement, from controller 108, of the lock command the tag was previously transmitting, then, in at least some embodiments, tag 810 would have been transmitting its RF signal (including the "lock command") at a reduced rate, such as once every 3 seconds at previously discussed. In such a situation, then the answer to the question at operation 1009 would consider whether a lock command was issued within, approximately, the last 3 seconds.

At operation 1011, consider whether an acknowledgement to the "unlock command" (operation 1010) has been received. If "yes," then there is no need to continue transmitting the unlock command, so, in accordance with operation 1008, the tag does not transmit a "change-of-state command" (i.e., stops transmitting the "unlock command"). If an acknowledgement has not been received, then, per operation 1012, the tag continues to transmit the "unlock command."

The processor(s) operating in controller 108 and tag 810 are general-purpose processors that are capable of, among other tasks, executing an operating system and executing specialized application software used in conjunction with the embodiments of the invention. The processor(s) are also capable of populating, updating, using, and managing data in data storage. In some alternative embodiments of the present invention, the processor(s) are special-purpose processors. It will be clear to those skilled in the art how to make and use the processor(s) for the controller and tag.

Data storage is non-volatile, non-transitory memory technology (e.g., ROM, EPROM, EEPROM, hard drive(s), flash drive(s) or other solid state memory technology, CD-ROM, DVD, etc.) that store, among any other information, data, including, without limitation, equipment-identification information, LF-noise characteristics and corresponding sources, and specialized application software, which, when executed, enable the tag's processor to practice the methods disclosed herein. It will be clear to those skilled in the art how to make and use data storage.

The disclosed methods and systems may be readily implemented in software, such as by using object or object-oriented software development environments that provide portable source code that can be stored in data storage of the tag. Alternatively, the methods may be implemented partially or fully in hardware, such as by using standard logic circuits or VLSI design, which are incorporated into the tag. Whether software or hardware is used to implement the method and systems disclosed herein may be dependent on various considerations, such as the speed or efficiency requirements of the system, the particular function, and the particular software or hardware systems being utilized.

The appended claims should not be read as limited to the described order or elements unless stated to that effect. In addition, use of the term "means" in any claim is intended to invoke 35 U.S.C. § 112, ¶6, and any claim without the word "means" is not intended to do so.

It is to be understood that the disclosure describes a few embodiments and that many variations of the invention can easily be devised by those skilled in the art after reading this disclosure and that the scope of the present invention is to be determined by the following claims.

What is claimed is:

1. A security system comprising:

a tag that receives, to the extent present, electromagnetic radiation (EM) in the LF band, wherein the EM radiation contains either an LF signal, LF emissions but no LF signal, or both an LF signal and LF emissions, and wherein, when the EM radiation includes the LF emissions, either alone or in conjunction with an LF signal, the tag:

(a) detects the LF emissions;

(b) generates, in response to detecting the LF emissions, a RF signal capable of resulting in a change-of-state of a final control element; and (c) transmits the RF signal.

2. The security system of claim 1 further comprising a controller, wherein the controller receives the RF signal.

3. The security system of claim 2 wherein the controller issues a change-of-state command to the final control element based on information contained in the received RF signal.

4. The security system of claim 3 wherein the final control element is a lock.

5. A security system comprising:

a controller, wherein the controller comprises an RF receiver that receives a RF signal including first information, and wherein the controller transmits a control signal that results in change-of-state of a final control element, wherein the change-of-state is based on the first information; and a tag, wherein the tag comprises:

a RF transceiver that receives electromagnetic radiation (EM) in the LF band;

a processor, wherein when the EM contains LF noise, the processor detects that the LF noise has been received and, upon detecting the LF noise, the RF transceiver generates and transmits the RF signal containing the first information.

6. The security system of claim 5 and further comprising the final control element.

7. The security system of claim 6 and further wherein the controller further comprises an LF exciter, wherein the LF exciter generates and periodically transmits a low frequency (LF) signal including a first identifier.

8. The security system of claim 7 and further wherein the tag comprises data storage, and wherein:

(i) the data storage includes a first identifier decoded from the LF signal that was received immediately prior to determining that LF noise has been received; and (ii) the first information comprises the first identifier.

9. The security system of claim 8 and further wherein the first information comprises a tag identifier.

10. The security system of claim 5 wherein the tag determines, from analyses of the LF emissions, a source of the LF emissions.

11. The security system of claim 10 wherein the first information is based on the determination of the source of the LF emissions.

12. The security system of claim 6 wherein the final control element is a lock.

13. The security system of claim 12 wherein the lock controls a door, and the source of LF emissions is proximal to the door, and further wherein the LF exciter is operated to ensure that the tag receives the LF signal before receiving the LF emissions.

14. The security system of claim 5 wherein the tag transmits the RF signal at a first, relatively faster rate until receiving an acknowledgment, from the controller, that the RF signal has been received, at which time, the tag transmits the RF signal at a second, relatively slower rate.

15. A security system comprising a tag, the tag having:

a LF receiver that receives LF emissions from at least one of a plurality of noise sources;

data storage, the data storage containing reference data representing first characteristics of the plurality of noise sources;

a processor that processes the received LF emissions to detect first characteristics of the LF emissions; and a RF transmitter that transmits a command to lock a door when the processor detects the first characteristics of the LF emissions.

16. The security system of claim 15 and further wherein the processor:

compares the first characteristics of the LF emissions to the reference data; and determines a source of the LF emissions by matching the first characteristics of the LF emissions to the first characteristics of the at least one noise source of the plurality thereof.

17. A method comprising:

receiving, at a tag, EM radiation in the LF band, the EM radiation including a LF signal and LF emissions;

detecting, at the tag, that LF emissions are being received thereby; and generating and transmitting, at the tag, a RF signal that is received by a controller, wherein the controller can change the state of a final control element, wherein the change in state of the final control element results in a change in state of a device or mechanism in a monitored region.

18. The method of claim 17 wherein receiving the EM radiation including LF emissions further comprises receiving the LF emissions from one of: (a) an LF reader, (b) a mobile telecommunications device having a display screen, (c) a mobile computing device having a display screen, and (d) a medical instrument.

19. The method of claim 17 wherein generating and transmitting the RF signal further comprises generating and transmitting a RF signal containing a lock command.

20. The method of claim 17 and further wherein when the LF signal and the LF emissions are no longer received at the tag, generating and transmitting the RF signal further comprises generating and transmitting a RF signal containing an unlock command.

21. The method of claim 18 wherein detecting the LF emissions further comprises determining a source of the LF emissions.

22. The method of claim 21 wherein a decision to generate and transmit a lock command from the tag is based on the source of the LF emissions.

23. A method, wherein the method is performed in a portable tag, the method comprising:

receiving an LF signal containing an identification (ID) of a source of the LF signal;

decoding the LF signal to obtain the ID;

after decoding the LF signal, receiving an LF emission that prevents the tag from decoding LF signals;

identifying the LF emission as having predetermined characteristics; and transmitting a command to lock a door in response to identifying the LF emission as having predetermined characteristics.

24. The method of claim 23 wherein, when the LF emission is received by the tag immediately after receiving the LF signal containing the ID, sending the command to controller associated with the ID.

25. The method of claim 23 wherein, when the LF emission is not received immediately after receiving the LF signal, sending the command in a broadcast manner.

26. The method of claim 23 wherein, after receiving the LF signal and the LF emission, the tag stops receiving the LF signal and the LF emission, the method further comprising transmitting a command to unlock the door.

27. The method of claim 26 wherein after transmitting the command to unlock the door, receiving an acknowledgement that a controller received the command to unlock the door.

28. The method of claim 27 wherein after receiving the acknowledgement, the method further comprising ceasing to transmit the command to unlock the door.

* * * * *